Sept. 4, 1923.
1,467,135
A. CONTI ET AL
IMPLEMENT FOR EXPANDING DEMOUNTABLE RIMS
Filed Jan. 31, 1922
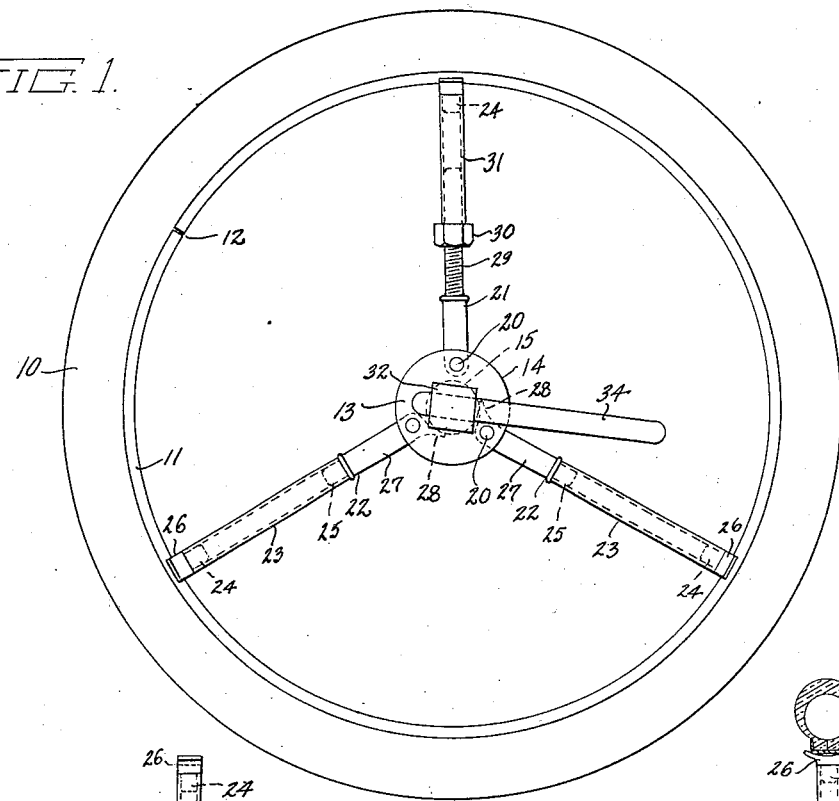
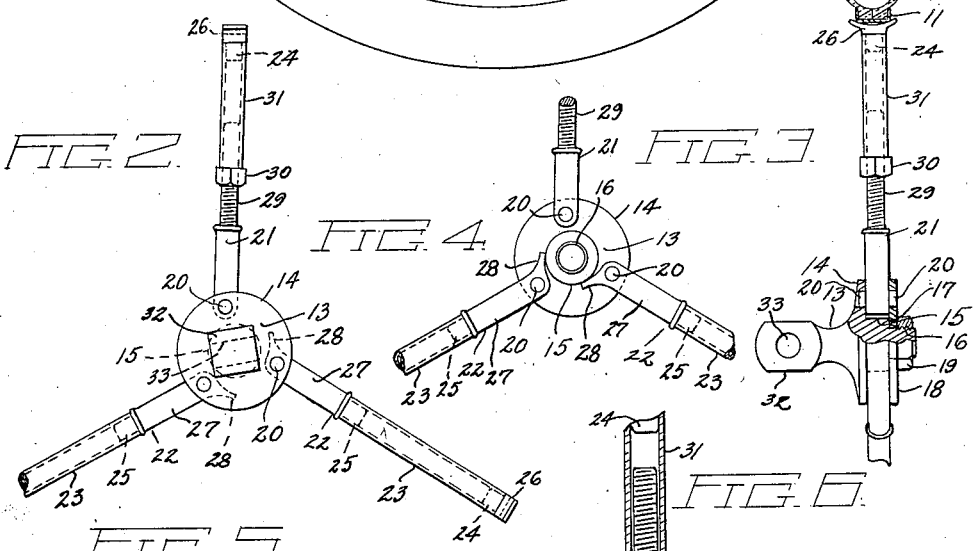
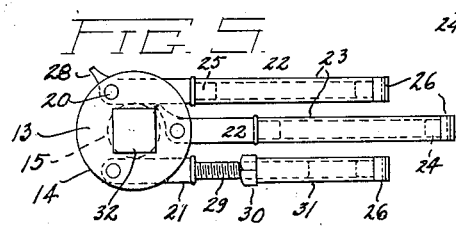
INVENTORS.
Andrea Conti and
Amatore Barroni
BY Wooster & Davis
ATTORNEYS.

Patented Sept. 4, 1923.

1,467,135

UNITED STATES PATENT OFFICE.

ANDREA CONTI AND AMATORE BORRONI, OF NEW HAVEN, CONNECTICUT.

IMPLEMENT FOR EXPANDING DEMOUNTABLE RIMS.

Application filed January 31, 1922. Serial No. 533,003.

*To all whom it may concern:*

Be it known that we, ANDREA CONTI, a citizen of the United States, and AMATORE BORRONI, a subject of the King of Italy, both residing at New Haven, county of New Haven, State of Connecticut, have invented an Improvement in Implements for Expanding Demountable Rims, of which the following is a specification.

This device relates to an instrument to facilitate the application of automobile tires to expansible rims, and has for an object to provide a simple and efficient device which may be easily and quickly inserted in position within an expansible rim after a tire has been placed around the same and then manipulated to expand the rim to proper position.

It is a further object of the invention to provide a device of this character which may be easily and quickly folded to a collapsed condition to facilitate storing either in an automobile, or a garage, or to facilitate packing for shipping purposes.

With these and other objects in view we have devised the construction illustrated in the accompanying drawing, in which—

Fig. 1 shows our device applied within an expansible rim showing the position after the rim has been expanded.

Fig. 2 is a similar view of the device but showing the relative positions of the parts before operation to expand the rim.

Fig. 3 is a partial side view looking from the right of Fig. 1 with portions of the support broken away to illustrate the details of construction.

Fig. 4 is a view of the support and means for securing the elements thereto looking from the right of Fig. 3, but with the securing washer and nut removed from the support.

Fig. 5 is a view of the device in collapsed position, and

Fig. 6 is a detailed, sectional view of a portion of one of the elements.

An automobile tire casing, which may be of any type or construction, is shown at 10, mounted upon an expansible rim 11 in a manner well known. In order to facilitate the removal of the casing from or its application to the rim, the rim is split at 12 to allow it to be collapsed. After the rim has been collapsed, however, it is a somewhat difficult operation, ordinarily, to expand the same to its operative position illustrated in the drawing. We have, however, devised a simple and efficient instrument for properly expanding the rim and one which may be easily and quickly placed in position and manipulated to perform the expanding operation.

This device comprises a support 13 provided with a flange 14 surrounding a hub 15 which is reduced at 16 and threaded, as shown, the reduced portion providing a shoulder 17. The reduced threaded portion is adapted to receive a washer 18 which is clamped against the shoulder 17 by means of a nut 19 threaded on the reduced portion. The flange 14 and the washer 18 are provided with aligned openings, spaced outwardly from the hub 15, to receive pivot pins or studs 20 carried by the expanding elements 21 and 22 to pivotally secure these elements to the support.

These elements preferably are three in number, as this number renders the device more easily applied and used, though we do not wish to be limited to this number as, obviously, more or less may be employed, if desired. All of these elements may be constructed so that their lengths may be adjusted, but we have found it to be sufficient to construct only one so that it may be adjusted. Obviously, there are numerous ways in which these elements may be constructed, but we prefer that substantially as shown, as it is simple and may be easily and cheaply manufactured. The elements 22 comprise a section of metal tubing 23 having forced fit at its opposite ends with the reduced portions 24 and 25 of the sections 26 and 27 respectively, although, if preferred, any other suitable elements, such as threading, may be employed, if desired. The outer end of the sections 26 are preferably curved, as shown in Fig. 3, so that they will engage the inner wall of the rim and not be likely to move sidewise therefrom in operation. The inner sections 27 carry a pivot pin or studs 20 and are adapted to be inserted between the flange 14 and the washer 18, and are provided with stop elements 28 extending at an angle to one side of the pivots and are adapted to abut against the surface of the hub 15 to limit movement of the elements about their pivots in one direction, as shown in Figs. 1 and 4, but allow movement of these elements in the opposite direction until the opposite sides of the inner sections 27 rest against this hub, as shown in Fig. 5. The other expanding element 21, however, does not have any stop element 28 and so may be swung an equal amount in either direction about its pivot so that the three elements may be moved to substantially parallel relation, as shown in Fig. 5, to collapse the device and thus reduce the space occupied thereby for storing or shipping. The element 21 is constructed so that its length may be adjusted, the inner section thereof being threaded at 29 on which is mounted a nut 30 against which one end of the tubular section 31 abuts but which tubular section has a loose fit on the threaded portion 29. The outer end of this section, however, has forced fit with the outer section 26, the same as the tubular sections 23, and it will be apparent that, by adjusting the nut 30, the element 21 may be adjusted as desired for variations in the size of the rims. The support 13 is provided with a polygonal head 32 to receive a wrench or other implement by which it may be rotated, or it may have a transverse opening 33 to receive a rod 34 by which the element may be rotated in an obvious manner.

In operation, the outer ends of the elements 22 are placed in contact with the inner wall of the rim, and the element 21 is adjusted, if necessary, to also bring its outer end in contact with this wall when the support 13 is turned to the left about its pivot to substantially the position shown in Fig. 2. In this position the pivot pins 20 are at one side of the lines joining the center of this support and the points of contact of the elements with the rim. Rotation of this element, by means of a wrench or rod 34, to the right or clockwise, as viewed in Fig. 2, will move the centers of the pivot pins 20 to these lines and will thus operate to move the elements 21 and 22 outwardly or substantially radially of the rim to expand the same. The stop elements 28 are preferably so positioned that they will not come in contact with the surface of the hub 15 until the centers of the pivot pins 20 have moved in this clockwise movement slightly beyond the line joining the center of the support 13 and the points of contact of the elements 21 and 22 with the rim, so that the device will not collapse of itself upon removal of force from the support, thus obtaining a toggle action, as will be obvious. It will also be apparent that, because of this toggle action, a considerable expansion force may be applied to the rim with a comparatively slight force applied to the wrench or rod 34. With a slight movement of the support 13 counter-clockwise, the device may be removed from the rim, as will be obvious.

Having thus described the nature of our invention, what we claim is:

1. A rim expander comprising a support provided with a hub, a plurality of elements pivoted to the support outwardly of the hub and adapted to engage the inner wall of an expansible rim, part of said elements being provided with stops adapted to coact with the hub to limit movement of said elements in one direction about their pivots, and means for rotating the support to move the elements outwardly to expand the rim.

2. A rim expander comprising a support, a plurality of elements pivoted to the support at points spaced from each other and adapted to engage the inner wall of an expansible rim, said support adapted to be rotated to move the elements outwardly to expand the rim and coacting stop means carried by some of said elements and the support to limit movement of said elements about their pivots in one direction, said means being also arranged to automatically limit the rotation of said support to a small amount beyond the extreme expanded position.

3. A rim expander comprising a support, a plurality of elements adapted to engage the inner walls of an expansible rim, means for adjusting the length of one of said elements, and pivot means for securing the elements to the support at points spaced from each other and arranged to allow movement of said elements to a substantially parallel relation to facilitate storing, said support adapted to be rotated to move the elements outwardly to expand the rim, and coacting stop means carried by one or more of said elements and the support arranged to automatically limit said rotative movement of the support to a small amount beyond the extreme expanded position.

4. A rim expander comprising a support, and three elements pivoted to said support at a distance from the center thereof and from each other and provided with abutments adapted to engage the inner surface of an expansible rim, the support being provided with a hub and two of said elements being provided with stop means adapted to engage said hub to limit movement of said elements about their pivots in one direction and arranged to allow movement of the elements to substantially parallel relation, said support adapted to be rotated to move the elements substantially radially of the rim to expand the same.

In testimony whereof we affix our signatures.

ANDREA CONTI.
AMATORE BORRONI.